Oct. 19, 1943.　　A. D. MacLEAN　　2,331,994
PILOT LOADING OR CONTROL REGULATOR
Filed Nov. 10, 1939　　3 Sheets-Sheet 1
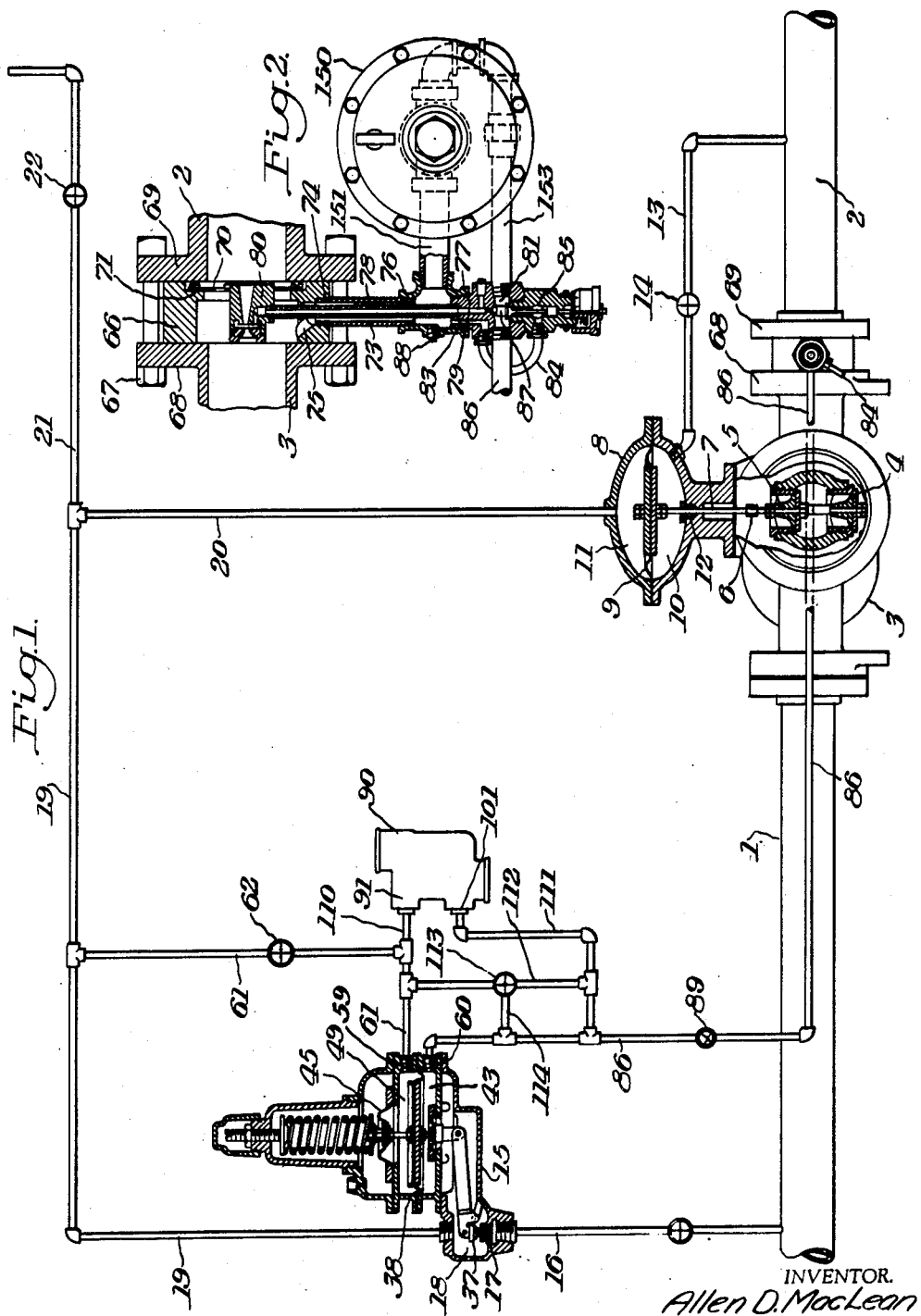
INVENTOR.
Allen D. MacLean
BY Lewis D. Knigeford
ATTORNEY.

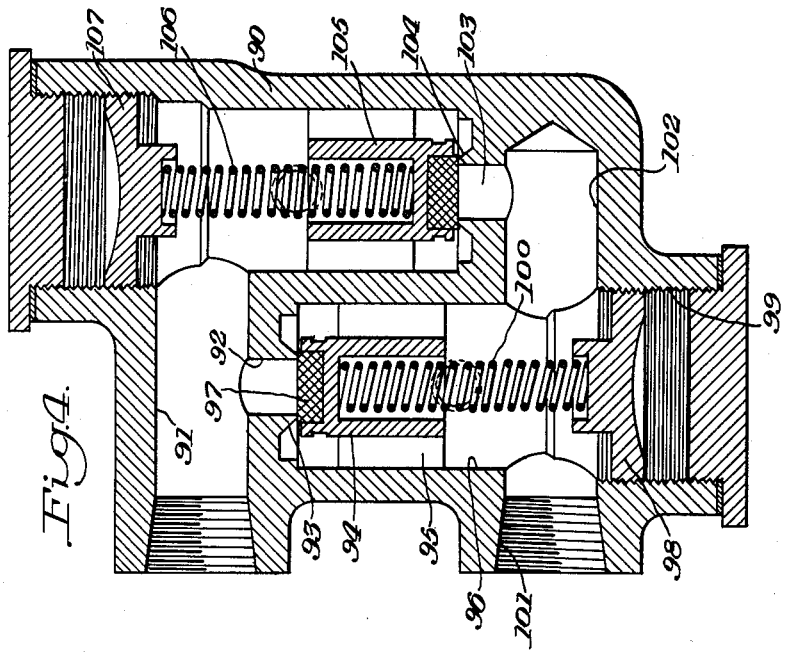
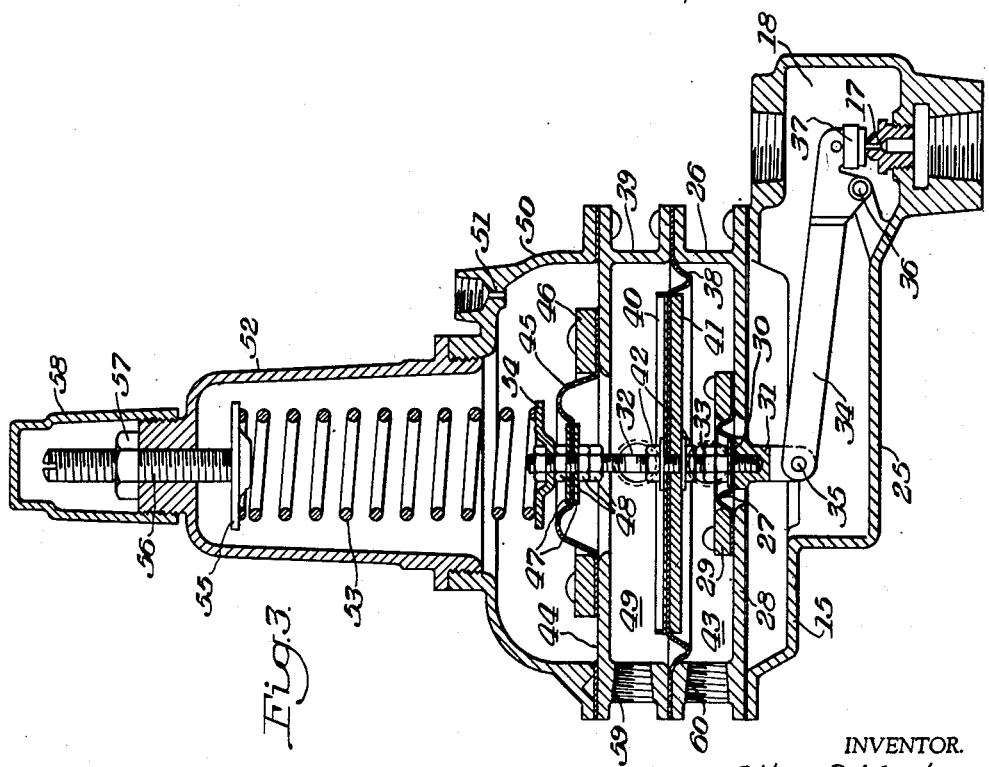

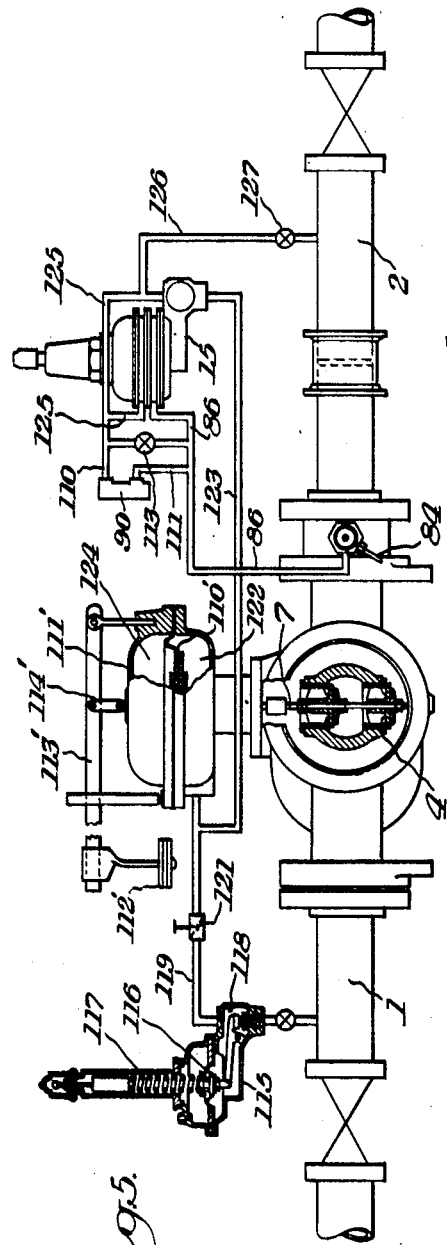

Patented Oct. 19, 1943

2,331,994

UNITED STATES PATENT OFFICE 2,331,994

PILOT LOADING OR CONTROL REGULATOR

Allen D. MacLean, Pittsburgh, Pa., assignor to Pittsburgh Equitable Meter Company, Pittsburgh, Pa., a corporation of Pennsylvania Application November 10, 1939, Serial No. 303,800

5 Claims. (Cl. 50—16)

The present invention relates to pilot loading or control systems in which a pressure is maintained in the system outlet which is dependent on the demand or rate of flow therein. In gas distribution systems it is frequently desirable to have the pressure in the distribution or street mains increase with increased rate of flow or demand in order that a sufficient supply of gas be maintained at periods of peak demand. When the pressure supplied to the district governors is relatively low, a directly acting regulator may be employed, and a suitable pressure boost may be obtained in known manner. However, in those cases where the pressure supplied to the district governor is high enough to require a pilot loading or control system of regulation, the arrangements available for low pressure regulators are not satisfactory. Usually in pilot loading or control systems the inlet pressure is on the order of several pounds and may be as high as several hundred pounds pressure, whereas the outlet pressure may be on the order of several ounces, and the variation in rate of flow will produce a pressure difference of only a few ounces available for controlling the high pressure valve. This pressure is not sufficient to produce an appreciable effect on the high pressures employed for loading or controlling the main regulator in such systems.

According to the present invention I provide a pilot loading or control system in which a change in pressure on the order of several ounces due to a change in rate of flow in the regulator outlet is made to control a pilot pressure on the order of several pounds, and thus produces a loading effect in the outlet dependent on the rate of flow. This is accomplished without the intermediary of links or other mechanical leverage mechanisms. In the preferred modification there is provided a main regulator and a pilot regulator, the latter having a plurality of diaphragms providing separate control chambers to which are conducted the pilot loading pressure for loading the main regulator and the pressure change due to rate of flow in the main regulator outlet in such manner that the pilot loading pressure exerted on the main regulator is changed by variation in the rate of flow and thus acts to change the outlet pressure in accordance with the rate of flow. The preferred type of element employed for producing a pressure differential dependent on rate of flow consists of an orifice plate having an inserted Venturi section adjacent thereto. However, any other suitable type of differential pressure producing device may be employed for this purpose.

The invention will be described in greater detail in connection with the accompanying drawings, wherein I have illustrated preferred embodiments of the invention by way of example, and wherein Figure 1 is a view partly diagrammatic of a preferred pilot loading system, Figure 2 is a sectional view showing the preferred differential pressure producing device, Figure 3 is a view in vertical section through a preferred type of pilot control regulator, Figure 4 is a view in vertical section showing a preferred type of automatic safety valve, Figure 5 is a partly diagrammatic view of a preferred pilot control system, and Figure 6 is a further modification of a pilot control system.

Referring to the drawings, Figures 1 to 4, the numerals 1 and 2 represent high and low pressure mains respectively of a fluid distribution system with a regulator body 3 therebetween having a reducing valve 4 therein which preferably is of the balanced type opening downwardly. The stem 5 of valve 4, as shown, is connected by a coupling 6 of suitable construction to the operating stem 7 of the pressure loading head, indicated generally by the numeral 8. The head 8 has a diaphragm 9 therein of suitable construction providing separate fluid pressure chambers 10 and 11 on opposite sides thereof and a stuffing box 12 may be used to separate the fluid pressure responsive chamber 10 from the pressure within the regulator body 3. Pressure chamber 10 is connected by a conduit 13 to any suitable point in the low pressure main, and may have an adjustable restricted orifice therein, such as a needle valve 14, if desired.

A multiple diaphragm regulator indicated generally at 15 is provided to apply a loading pressure to the chamber 11 of the pressure loading head 8. Fluid pressure from the high pressure main 1 is conducted by conduit 16 through the valve inlet 17 (Figures 1 and 3) of the pilot regulator 15 into valve chamber 18 and the outlet conduit 19 from the valve chamber 18 is connected by a conduit 20 to the loading chamber 11 of the pressure loading head 8. An extension 21 of conduit 19 having an adjustable needle valve 22 therein is provided for venting the conduit 20 to provide a slow bleed to atmosphere. The conduit 20 thus serves as an inlet and outlet to chamber 11.

Referring to Figure 3, the regulator 15 comprises a valve housing 25 having a casing 26 secured to its top, and a sealing diaphragm 27 or the like is clamped at its outer periphery between the wall 28 of the casing 26 and a clamping ring 29. A bifurcated connecting piece 31 has a diaphragm rod 32 threadedly connected thereto, and the center of diaphragm 27 is clamped between washer 30 and connecting piece 31 by lock nuts 33. A lever 34 is pivoted at 35 at one end to connecting piece 31 and is pivoted at 36 adjacent its other end to the casing and carries a valve 37 adapted to control the orifice 17.

A control diaphragm 38 is secured at its outer periphery between the flanged case 26 and a third case member 39, and at its center the diaphragm is clamped between plates 40 and 41 to the diaphragm rod 32 by lock nuts 42. There is thus provided a chamber 43 sealed from valve chamber 18. The opening in the top wall 44 of case 39 is closed by a diaphragm 45, the periphery of which is clamped thereto by a ring 46, and the center of which is secured to the diaphragm rod 32 between washers 47 by lock nuts 48. There is thus provided pressure chambers 43 and 49 on the opposite sides of diaphragm 38.

A cover member 50 provided with a vent 51 to atmosphere is secured to case 39, and a spring housing 52 is threaded into the cover. One end of spring 53 abuts an abutment plate 54 suitably secured to the diaphragm stem 32 and the other end engages an adjustable abutment 55 having a stem 56 threaded through cover 52 and locked in position by nut 57. A cap 58 encloses nut 57 and the end of the stem 56. A tapped connection 59 is provided for control chamber 49, and a tapped connection 60 is provided for low pressure chamber 43. A conduit 61 having a needle valve 62 therein connects conduit 19 with the control chamber 49 (Figure 1).

I provide a suitable differential pressure producer in the low pressure main, such as is described in Patent No. 2,093,842, issued September 21, 1937 to Allen D. MacLean and Fritz Niesemann to produce a zone of low pressure dependent on the rate of flow. The preferred construction of the pressure differential producing device is shown in detail in Figure 2 and comprises a hollow cylindrical body member 66 inserted in the pipe line and clamped by bolts 67 between the flange 68 of the regulator body 3 and flange 69 of the adjacent pipe section of the low pressure main 2. The orifice plate 70 is secured by screws or by any other suitable means to the internal shoulder 71 of the insert.

A pipe or conduit 73 is threaded at one end into a hole 74 in the insert 66 and is connected by a passage 75 with the interior of the insert 66, and at its other end the conduit 73 carries a T fitting 76 which receives a ported body member 77. A second conduit 78 is threaded at one end into bore 79 of the body member 77 and at its opposite end its is ehreaded into an inserted Venturi section 80 constructed as described in Patent No. 2,093,842. The low pressure producing device herein described is preferred because it is compact and within a very short pipe length a great differential in pressure and excellent recovery can be produced with an over-all pressure loss much less than would be produced by an orifice plate alone required to give the same differential pressure. However, it will be understood that any other type of low pressure or differential pressure producer may be employed.

Bore 79 of ported body member 77 terminates in a valve chamber 81, and the annular space between tubes 73 and 78 communicates by a bore 83 and tube 84 with a valve stem channel 85. A conduit 86 leads from valve chamber 81 and is connected at 60 with low pressure chamber 43 of pilot regulator 15. A throttling valve 89 preferably is inserted in conduit 86, which may be adjusted to vary the rate of flow therethrough and thus vary the sensitivity of response of diaphragm 38 to changes in rate of flow in main 2. As bore 79 and stem channel 85 both terminate in tapered valve seats it will be apparent that the relationship between the pressure in valve chamber 81 and the low pressure zone at the throat of inserted Venturi section 80 may be varied by adjusting the valve member 87. If desired, plug 88 may be removed from T 76 and the conduit 13 connected thereto to the main 2.

I provide a double acting safety valve 90 to prevent sudden changes in control or loading pressure. Referring to Figure 4, this safety valve comprises a body having a passageway 91 connecting with a passage 92 terminating in a valve edge 93. A plunger 94 having wing guides 95 is located in enlarged bore 96 and carries a seat insert 97 at its end adapted to co-operate with valve edge 93. A plug member 98 threaded into bore 99 serves as an adjustable abutment for spring 100 which determines the pressure in passage 91 required to unseat valve plunger 94. When valve plunger 94 is unseated fluid flows through orifice 92 into chamber 96 and out passage 101 to conduits 111 and 86.

Passage 101 is extended through chamber 96 as indicated at 102 and communicates with an orifice 103 terminating in a valve edge 104 and closed by a valve plunger 105, exactly like valve plunger 94 and biased by a spring 106, the pressure of which may be adjusted by an abutment 107. It will thus be seen that an excess pressure in passage 102 unseats valve plunger 105 and allows fluid to escape into passage 91. Passage 91 is connected by conduit 110 with conduit 61 and loading chamber 49 of the pilot regulator, and passage 101 is connected by conduit 111 with the conduit 86 and control chamber 43. There is also provided a by-pass conduit 112 having a valve 113 therein, and a cross conduit 114 by which the various pressures may be equalized when installing the apparatus.

The operation of the apparatus now will be described. To better understand the principle of operation, it may be assumed that the pressure in conduit 86 is constant and that valve 37 of the regulator 15 is throttled to a position such that the flow entering conduit 19 is equal to the bleed through valve 22 so that a constant load is applied to chamber 11 over diaphragm 9. As chamber 10 is connected by conduit 13 to the low pressure main, the diaphragm 9 will respond to the difference in pressures in chambers 10 and 11 (the pressure in 11 being assumed constant) and thus will respond to the pressure in main 2 to control valve 4 to maintain a pressure in main 2 corresponding to the assumed constant loading pressure in chamber 11. The pressure in chamber 11 is dependent upon the position of valve 37 (the bleed valve 22 being kept fixed), and by controlling the position of valve 37 in accordance with the demand in main 2, the pressure in chamber 11 may be increased or decreased in accordance with the demand.

The position of valve 37 is determined by the summation of a number of opposing forces. The forces tending to open valve 37 are the spring 53, the pressure in chamber 49 against the diaphragm 38, and the pressure in chamber 43 against sealing diaphragm 27. The forces tending to close the valve are the pressure in chamber 49 against diaphragm 45 and the pressure in chamber 43 against diaphragm 38, and the pressure in chamber 18 against diaphragm 27. To simplify the explanation the pressure effect on sealing diaphragm 27 and the weight of the parts may be neglected, although in practice they are taken into account. When the demand in main 2 increases, the drop in pressure in main 2 is transmitted by conduit 13 to chamber 10 and tends to open valve 4, and if allowed to act without changing the regulator 15 it would merely hold the pressure in main 2 substantially constant. However, the increased flow in main 2 produces a lowering of pressure at the throat of Venturi section 80 and this lowered pressure is transmitted by conduit 86 to chamber 43, thus upsetting the balance of the pressures controlling valve 37 and causing valve 37 to open and increase the pressure in conduit 19. This causes an increase in pressure in chamber 11 so that now it requires a greater pressure in chamber 10 to close the valve 4 than heretofore, and consequently flow into main 2 will continue until the pressure in chamber 10 is built up to the higher value required to close the valve 4. Conversely, when the demand in main 2 decreases, the pressure in Venturi section 80 will rise and the resulting increase in pressure in chamber 43 will hold valve 37 closed until the bleed 22 has lowered the pressure in chamber 11 down to a corresponding lower value, and valve 4 will not open until the pressure in main 2 reaches this lower value.

It will thus be seen that an automatic loading force is provided on the diaphragm 9 which is dependent upon the rate of flow in the main 2 so that the pressure in main 2 builds up as the rate of flow therein increases and lowers as the rate of flow or demand therein decreases. The rate of response of the loading pressure may be adjusted by adjustment of valve 87 to allow a desired bleed from conduit 73 into valve chamber 81, and the control hand wheel of valve 87 may be graduated to permit accurate setting thereof and to enable duplication of desired settings.

In the modification shown in Figure 5 wherein like parts are correspondingly numbered, the valve 4 is controlled by a diaphragm 110' in diaphragm case 111' and a loading force is provided by a weight 112' on a lever 113' secured by a link 114' to the diaphragm and valve stem 7. The control pressure is supplied from the high pressure main 1 through an outlet pressure controlled high pressure regulator 115 having a relatively small diaphragm 116 and a strong spring 117. The gas from valve chamber 118 passes by a conduit 119 having a needle valve 121 therein, to the chamber 122 underneath the diaphragm 110' and the conduit 123 conducts the gas to the regulator 15 on the outlet side. The conduits 119 and 123 thus serve as inlet and outlet for chamber 122. Chamber 124 above the diaphragm 110' is vented to the atmosphere in any suitable manner. The throat of Venturi section 80 (Figure 2) is connected by conduit 86 (Figure 5) to the chamber 43 (Figure 3) of the regulator 15 and the outlet chamber 18 is connected by conduit 125 (Figure 5) to the chamber 49 of the regulator 15. A conduit 126 having a needle valve 127 therein connects conduit 125 to the low pressure main 2, or if desired, this conduit may be connected to pipe 73 (Figure 2).

The operation of this modification now will be described. When the flow in main 2 increases it causes a drop in pressure at the throat of the Venturi section 80 and this low pressure is transmitted by conduit 86 to the chamber 43 and acts to open the valve 37 of regulator 15. This permits a greater flow from the chamber 122 through conduit 123 and conduits 125 and 126 to the main 2, and causes a drop in pressure in chamber 122 so that the weight 112' causes the diaphragm 110' to lower and open valve 4 thus increasing the flow from main 1 into the low pressure main 2. This increased flow continues until the pressure conducted by conduits 126 and 125 to chamber 49 builds up sufficiently to overcome the upward force on diaphragm 38 exerted by gas in chamber 43 to close or restrict valve 37 and thus build up a pressure in chamber 122 sufficient to overcome the weights 112' and close or restrict valve 4. When the demand in main 2 falls off the pressure at the throat of the Venturi section rises, thus increasing the pressure in chamber 43 sufficiently to overcome the downward force and causing valve 37 to become restricted or closed, which results in building up the pressure in chamber 122 and to raise diaphragm 110' and close valve 4.

In the modification shown in Figure 6 the valve 130 in bowl 4 opens upwardly and is controlled by a lever 131 connected to a rod 132 having a diaphragm 133 secured thereto. A weight 134 provides a loading force for the diaphragm. Gas from the high pressure main 1 passes through a regulator 115 and by conduit 119 and needle valve 121 to the chamber 122 beneath the diaphragm 133 and a conduit 123 connects conduit 119 to the inlet side of a regulator valve 135. The regulator 135 has a sealing diaphragm 136 providing a valve chamber 137 and a control diaphragm 138 is controlled by weights 139 thereon. A vented chamber is formed above the diaphragm 138 and a control chamber 140 below the diaphragm 138 is connected by a conduit 141 having a throttle valve 142 therein to the throat of the Venturi section. The chamber 137 on the outlet side of the regulator 135 is connected by conduit 143 to the low pressure main 2. A by-pass 145 is provided between conduits 123 and 143 and is controlled by needle valves 146 and 147.

In this modification it is desirable to employ a pressure limiting device. As shown in Figures 6 and 2, the pressure limiting device consists of a direct acting back pressure regulator 150 having a connection 151 on one side of the valve 152 communicating with passage 75, and the conduit 153 on the other side of the valve 152 connects with the valve chamber 81.

The operation of this modification now will be described. The diaphragm 133 is loaded by the weights 134 and gas passing from the high pressure main through the regulator 115 and conduit 119 into the chamber 122 and bleeding into the low pressure main through conduits 123 and 145, needle valve 147 and conduit 143, counterbalances the load on the diaphragm 133. As valve chamber 137 of regulator 135 is sealed by a diaphragm 136, the valve of regulator 135 responds to the pressure in chamber 140 which is conducted thereto by conduit 141 from the Venturi section 80. When the flow through the low pressure main 2 increases the lower pressure produced in the Venturi section transmitted to the chamber 140 causes the diaphragm 137 to drop and thus opens the valve of the regulator 135 and allows escape of fluid from conduit 123 and thus lowers the pressure in chamber 122 and permits diaphragm 133 to lower and open the valves 130 to increase the flow into the low pressure main 2.

When the pressure in the main 2 rises too high due to the creation of too great a differential pressure in the inserted Venturi section, the valve 152 is opened by the back pressure regulator 150, thus allowing a flow from the main through passage 75 (Figure 2), conduit 151, valve 152, conduit 153 and passage 79 into the throat of the Venturi section to increase the pressure at the throat. This increase in pressure at the throat is transmitted to chamber 140 against diaphragm 137 to close the valve of regulator 135 and the pressure in conduit 119 therefore raises the diaphragm 133 and closes the valves 130. The valves 130 remain closed until the pressure at the throat of the Venturi section again reaches a value sufficient to enable the valve of regulator 135 to be opened.

I am aware that in the art the term "pilot control system" is frequently applied to a system in which the main regulator valve is loaded by a weight or spring and the pilot flow counteracts the force of the weight or spring, and the term "pilot loading system" is frequently applied to a system in which the main regulator valve is loaded by a pilot flow. However, in the present application I have used these terms synonymously unless otherwise expressly indicated.

What I claim as my invention and desire to secure by Letters Patent is:

1. In a gas distribution system, a main regulator valve adapted to be inserted in a conduit and having a diaphragm connected thereto forming chambers on opposite sides thereof, means providing a loading force and a control force acting on opposite sides of said diaphragm, at least one of said forces being produced by gas pressure, a pilot regulator valve for regulating or governing said gas pressure force, a diaphragm connected to said pilot regulator valve and subject on one side to the gas pressure force, means in said conduit responsive to rate of flow for producing a zone of low pressure, and a second diaphragm connected to said pilot regulator valve and subject on one side to the pressure in said low pressure zone and on the other side to said gas pressure force.

2. In a gas distribution system, a main regulator valve adapted to be inserted in a conduit and having a diaphragm connected thereto forming chambers on opposite sides thereof, a conduit connecting one of said chambers to the outlet side of said valve, a pilot regulator valve for supplying gas pressure to the other of said chambers, a diaphragm connected to said pilot regulator valve and subject on one side to the gas pressure, means in said first conduit responsive to rate of flow for producing a zone of low pressure, means for bleeding the pressure from said latter chamber, and a diaphragm connected to said pilot regulator valve and subject on one side to said low pressure zone and on the other side to the pilot gas pressure.

3. In a gas distribution system, a main regulator valve adapted to be inserted in a conduit and having a diaphragm connected thereto forming chambers on opposite sides thereof, means providing communication between one of said chambers and said conduit, a pilot regulator valve for supplying a loading pressure to the other of said chambers, means providing a variable bleed from said loading pressure chamber, means in said conduit responsive to rate of flow for producing a zone of low pressure, said pilot valve being connected to a diaphragm with differential pressure chambers on opposite sides thereof, means for conducting the loading pressure to one of said differential chambers, and means to conduct said low pressure to the other of said differential chambers, whereby said pilot regulator varies the loading pressure in accordance with the rate of flow through said conduit.

4. A pilot loading or control system comprising a high pressure main, a low pressure main, a valve for controlling the flow of gas between said mains, gas pressure responsive means connected to said valve to operate the same, means supplying gas under pressure to load said pressure responsive device and having a bleed opening, means in the low pressure main to produce a low pressure dependent on the rate of flow therein, and means controlled by said low pressure for controlling the gas supplied to load said fluid pressure responsive means, comprising a valve, a plurality of diaphragms of unequal area connected to said valve providing separate gas chambers, a conduit providing communication between the chamber bordered by two diaphragms and one of said mains, and a conduit providing communication between the other of said chambers and said low pressure producing means.

5. In a gas distribution system, a main regulator valve adapted to be inserted in a conduit and having a diaphragm connected thereto forming chambers on opposite sides thereof, means providing a loading force and a control force acting on opposite sides of said diaphragm, at least one of said forces being produced by gas pressure, one of said chambers having an inlet and an outlet at least one of which is governed by a pilot valve to control the gas pressure force in said chamber, a diaphragm secured to said pilot valve subject on one side to atmospheric pressure and on the other side to said gas pressure force, means in said conduit responsive to rate of flow for producing a source of low pressure, a third diaphragm secured to said pilot valve and subject to said low pressure source on one side and to said gas pressure force on the other side to respond to the differential pressure for controlling the gas pressure force, and means to vary the rate of transmission of said low pressure to said pilot valve diaphragm.

ALLEN D. MacLEAN.